(12) United States Patent
Grosskopf

(10) Patent No.: US 9,521,153 B2
(45) Date of Patent: Dec. 13, 2016

(54) PLATFORM TRUST EXTENSION

(71) Applicant: Gabriel Jakobus Grosskopf, Palo Alto, CA (US)

(72) Inventor: Gabriel Jakobus Grosskopf, Palo Alto, CA (US)

(73) Assignee: Dell Products L.P., Round Rock, TX (US)

( * ) Notice: Subject to any disclaimer, the term of this patent is extended or adjusted under 35 U.S.C. 154(b) by 53 days.

(21) Appl. No.: 14/461,474

(22) Filed: Aug. 18, 2014

(65) Prior Publication Data

US 2016/0050215 A1    Feb. 18, 2016

(51) Int. Cl.
*H04L 29/06*      (2006.01)

(52) U.S. Cl.
CPC ........... *H04L 63/105* (2013.01); *H04L 63/123* (2013.01)

(58) Field of Classification Search
USPC ...................................... 726/22–25
See application file for complete search history.

(56) References Cited

U.S. PATENT DOCUMENTS

| 2008/0065893 | A1* | 3/2008 | Dutta et al. | 713/176 |
| 2009/0210702 | A1* | 8/2009 | Welingkar | H04L 9/321 713/156 |
| 2010/0318968 | A1* | 12/2010 | Traut | G06F 8/36 717/122 |
| 2011/0019820 | A1* | 1/2011 | Ureche et al. | 380/255 |
| 2012/0096516 | A1* | 4/2012 | Sobel et al. | 726/2 |
| 2013/0042101 | A1* | 2/2013 | Neumann | H04L 9/3247 713/156 |
| 2014/0090077 | A1* | 3/2014 | Jeong | G06F 21/60 726/26 |
| 2014/0228001 | A1* | 8/2014 | Kulkarni | H04L 63/10 455/411 |
| 2014/0258128 | A1* | 9/2014 | Lei | H04L 63/20 705/44 |
| 2015/0222641 | A1* | 8/2015 | Lu | G06F 21/57 726/1 |
| 2016/0150296 | A1* | 5/2016 | Dewa | G06F 21/10 725/28 |

\* cited by examiner

*Primary Examiner* — Joseph P Hirl
*Assistant Examiner* — Chi Nguy
(74) *Attorney, Agent, or Firm* — Baker Botts L.L.P.

(57) ABSTRACT

A system and method of providing a platform trust extension for an information handling system is disclosed herein. The platform trust extension receives a notification that an application is selected for installation or execution on an information handling system. The identify of the application or the source of the application is identified based upon a signature of the application. The platform trust extension determines whether the application or the source of the application is semi-trusted based upon the signature of the application. If the application is semi-trusted, the platform trust extension permits the application to run at an additional trust level.

20 Claims, 4 Drawing Sheets

PLATFORM TRUST EXTENSION

TECHNICAL FIELD

This disclosure relates generally to information handling systems and, more particularly, to providing a platform trust extension for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
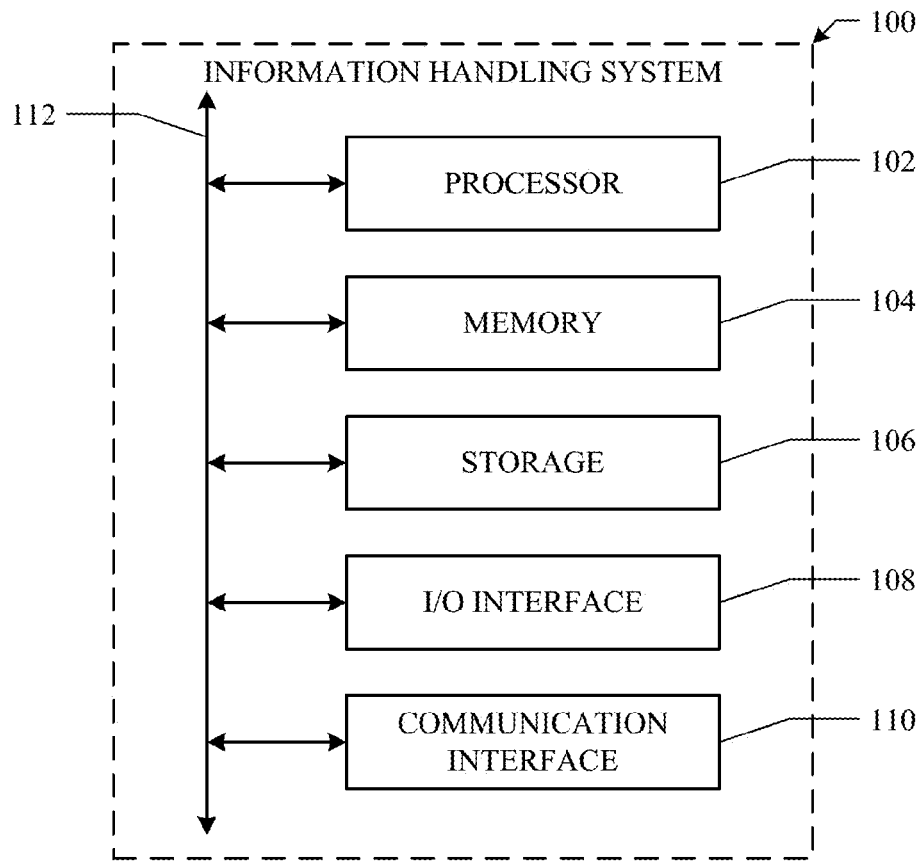
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
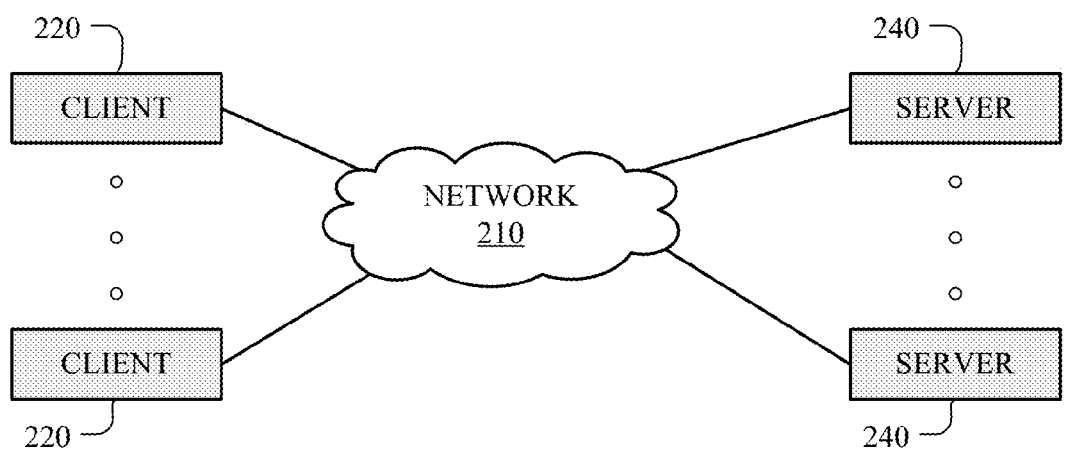
FIG. 2 is an example of a network environment.

Particular embodiments are best understood by reference to FIGS. 1-2, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, client device 200 may run an operating system that uses code signing for security, such as the Google Android Operating System. The operating system may require that an application (or any other executable code) be signed using a digital signature before being permitted to execute. The digital signature may be used to identify the source or author of the application. The source of the application may be used by the operating system to determine the level of trust given to the application. For example, the device manufacturer may sign the operating system and applications distributed with the operating system with a key associated with the device manufacturer. The key associated with the manufacturer may be referred to as a platform key. The operating system may be operable to recognize and trust code signed with the platform key, and give applications signed with the platform key the ability to call most or all application programming interfaces (APIs) available to the operating system. The operating system may be operable to give applications signed with the platform key access to data that is typically only accessible to the operating system.

Applications that are not signed with the platform key, or another key recognized by the operating system as trusted, may be treated as an untrusted application. The operating system may be operable to limit an untrusted application's access to a subset of APIs available from the operating system. For example, the operating system may be operable to limit the ability of an untrusted application to make changes to the user interface (UI) or configuration of the device 220. The operating system may be operable to limit an untrusted application such that it may only access data created by the untrusted application itself, or data that is made generally available to applications running on the device (e.g. publicly shared memory or shared data). The operating system may be operable to limit an untrusted application such that it may not access data associated with other untrusted or trusted applications on the client device 220. In some embodiments, an untrusted application may be permitted to access APIs or data associated with other applications installed on the device. The operating system may grant the untrusted application access to the APIs and data of other applications if the user or other application explicitly grants access to the untrusted application. The operating system may grant the untrusted application access to the APIs and data of other applications automatically if the other applications are signed with the same key used to sign the untrusted application.

In particular embodiments, a platform trust extension is provided. The platform trust extension may be pre-installed with the operating system with the client device 220 during manufacturing. Alternatively, the platform trust extension may be installed on the client device 220 after purchase. For example, the platform trust extension may be purchased and downloaded from an application store. The platform trust extension may comprise one or more trusted applications or executable code. The platform trust extension may be signed with a platform key or another key that is trusted by the operating system.

In particular embodiments, the platform trust extension may define an additional trust level (or security level). The additional trust level is given less trust than the level of trust given to the platform trust extension. For example, the additional trust level may only be granted a subset of the permissions granted to the platform trust extension's trust level. In a particular embodiment, the additional trust level is given the same permissions as the trust level of the platform trust extension except for the ability to alter the permissions or trust level of other applications. In a particular embodiment, applications at the additional trust level are permitted to make changes to the UI or configuration of the device 220.

In particular embodiments, the platform trust extension is operable to determine at install-time or run-time whether an application should be executed at the additional trust level. An application that the platform trust extension recognizes as an application that should be executed at the additional trust level may be referred to as a platform trust extension recognized application or a semi-trusted application. A particular embodiment is described with reference to FIG. 3. At step 300, the determination process begins. At step 305, the platform trust extension may check the application against a user-managed list of applications or application sources (e.g. keys) to be semi-trusted. If there is a match, the platform trust extension permits the application to run at the additional trust level at step 330. If there is no match, the platform trust extension may check the application against an organization-managed list of applications or application sources to be semi-trusted at step 310. If there is a match, the platform trust extension permits the application to run at the additional trust level at step 330. If there is no match, the platform trust extension may check the application to determine if it is signed with a key associated with the provider of the platform trust extension at step 315. If the application is signed with a key associated with the provider of the platform trust extension, then the application is permitted to run at the additional trust level at step 330. If there is no match, the platform trust extension may check the key used to sign the application against a list of keys to be semi-trusted that is maintained, at least in part, by the provider of the platform trust extension at step 320. If there is a match, the application may be permitted to run at the additional trust level at step 300. If the platform trust extension is unable to verify that the application is to be recognized by the platform trust extension or semi-trusted, the application is only permitted to run at the untrusted level at step 325. It should be appreciated that, in particular embodiments, not all of the illustrated steps may be performed by the platform trust extension, or that the platform trust extension may vary the order in which the steps are performed.

In particular embodiments, a user may maintain a list of applications or application sources whose applications should be permitted to execute at the additional trust level. In other words, the user may maintain a list of semi-trusted applications or application sources. A particular embodiment is described with reference to FIG. 4. At step 400, the process begins. At step 405, the user accesses a user interface for the platform trust extension. The user may be presented with a list of applications installed on the client device 220. The user may be presented with a list of sources for the application installed on the client device 220. For example, the user interface may enumerate all of the keys used to sign applications on the client device 220 and present any information identifying the source of the keys. For example, the list may contain an entry for "Dell Inc." if there is a key on the device 220 that was used to sign an application, and the key self-identifies as belonging to Dell Inc. At step 410, the user may select one or more applications or one or more keys to be semi-trusted. At step 415, the user interface may ask the user to confirm that the selected applications or keys should be granted permission to run at the additional trust level. At step 420, the platform trust extension adds the applications or keys selected by the user to a list of applications or keys to a data store that is owned by the platform trust extension. This data may be later used in a determination process, for example, in the process depicted in FIG. 3 at step 305.

Figure 5:
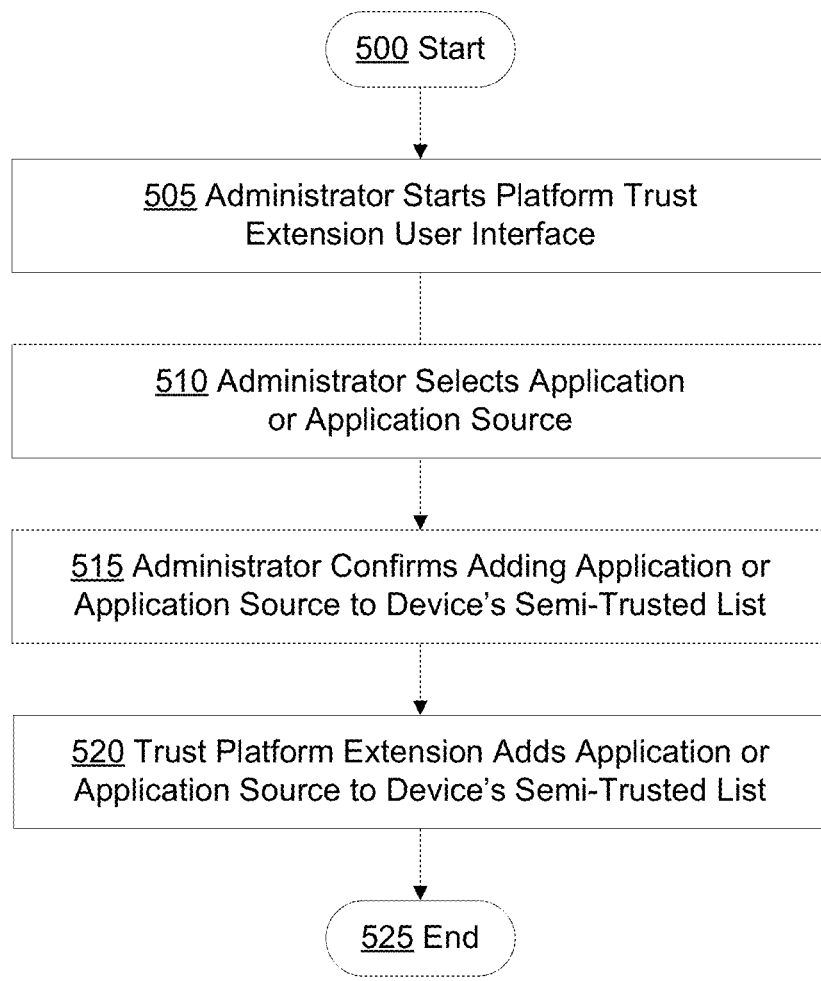
FIG. 5 is an example of a method for an administrator to add applications or sources of applications to a semi-trusted applications or sources list.

In particular embodiments, an organization may maintain a list of applications or application sources whose applications should be permitted to execute at the additional trust level on devices owned or controlled by the organization. In other words, an organization may maintain a list of semi-trusted applications or semi-trusted application sources for one or more client devices 220 owned or controlled by the organization. A particular embodiment is described with reference to FIG. 5. At step 500, the process begins. At step 505, an administrator (or a person authorized by the organization) accesses a user interface for the platform trust extension. The administrator may be presented with a list of applications installed on the client device 220, or a list of applications available to be installed on the client device 220. For example, applications available to be installed on the client device 220 may comprise a list of applications available in an application store. The administrator may be presented with a list of sources for the applications installed, or available to be installed, on the client device 220. For example, the user interface may enumerate all of the keys used to sign applications installed, or available to be installed, on the client device 220, and present any information identifying the source of the keys. At step 510, the administrator may select one or more applications or one or more keys to be semi-trusted. At step 515, the user interface may ask the administrator to confirm that the selected applications or keys should be granted permission to run at the additional trust level. At step 520, the platform trust extension adds the applications or keys selected by the administrator to a list of applications or keys to a data store that is associated with the organization and the platform trust extension. This data may be later used in a determination process executed by a platform trust extension, for example, in the process depicted in FIG. 3 at step 310.

Figure 3:
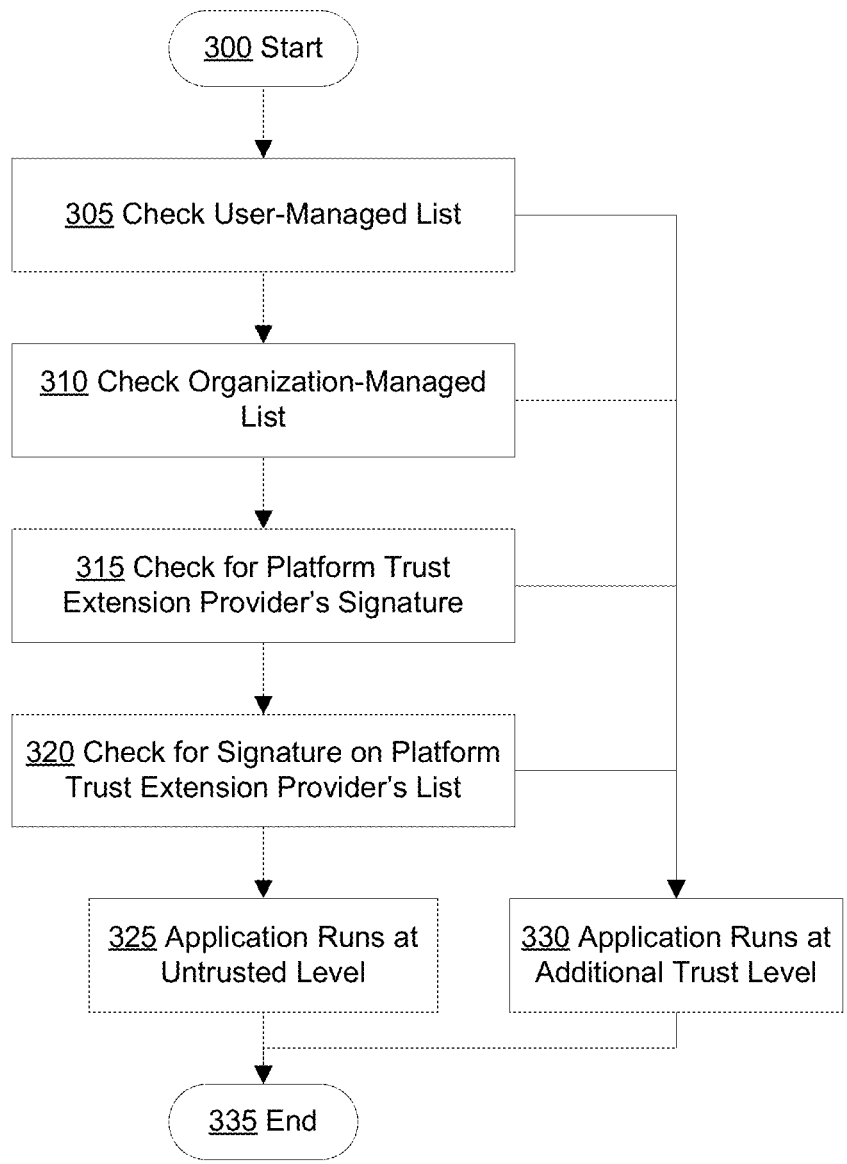
FIG. 3 is an example of a method to identify an semi-trusted application.
Figure 4:
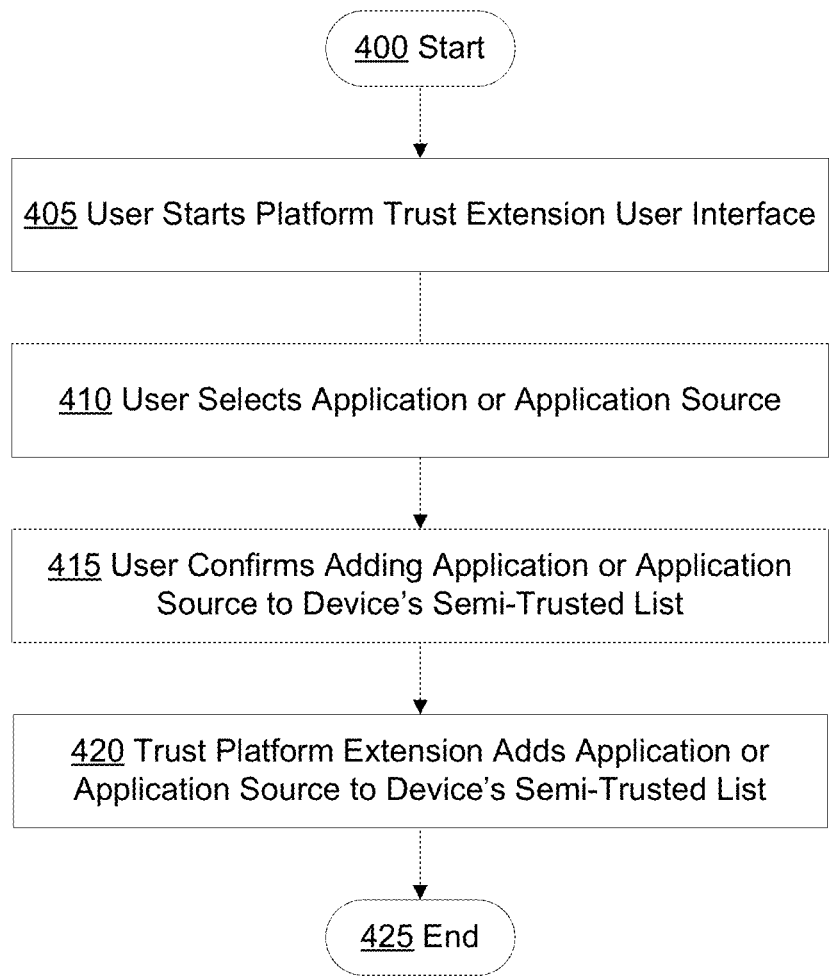
FIG. 4 is an example of a method for a user to add applications or sources of applications to a semi-trusted applications or sources list.

In another particular embodiment, the provider of the platform trust extension may sign an application with a key associated with the platform trust extension provider. For example, the platform trust extension provider may operate a certified developers program. If a developer complies with the requirements set by the platform trust extension provider, the certified developer may submit its application for signing by the platform trust extension provider. In a particular embodiment, the platform trust extension provider uses one or more keys that a platform trust extension is operable to recognize as a key to semi-trusted. In other words, the provider may sign the application with a key that a platform trust extension recognizes and is operable to permit the an application signed with the key to run at the additional trust level. After the platform trust extension provider signs the application with one of the keys, the provider returns the signed application to the developer for distribution. In a particular embodiment, a platform trust extension will recognize the signed application as an application to be executed at the additional trust level, for example, as depicted in FIG. 3 at step 315.

In another particular embodiment, the platform trust extension provider may maintain a list of keys that should be semi-trusted, and a platform trust extension will permit applications signed with those keys to run at the additional trust level. For example, the platform trust extension provider may operate a certified developers program. If a developer complies with the requirements of the program, the certified developer may submit one or more keys that it uses to sign its applications to the platform trust extension provider. The platform trust extension provider may add these keys to a list maintained by the platform trust extension provider as a list of semi-trusted keys. The platform trust extension may be operable to recognize that a key on the platform trust extension provider's list was used to sign an application and permit the application to run at the additional trust level. For example, a platform trust extension may make this determination in the process depicted in FIG. 3 at step 320.

It should be appreciated that the platform trust extension provider or the organization owning or controlling client device 220 may maintain one or more lists of applications or sources of applications to be semi-trusted. The respective lists provided to the platform trust extension on client device 220 may be filtered by the platform trust extension provider or organization based upon a number of factors that include, but are not limited to, the region of the device, language of the device, or the identity of the registered user of the device. The lists may be distributed as a static file accompanying the platform trust extension or the client device 220, or may be distributed in a dynamic method. For example, the lists may be implemented as one or more web or cloud services called by a platform trust extension, either in a batch transaction or dynamically at run-time. For example, a platform trust extension may periodically contact a cloud service and download the most current list available from the platform trust extension provider or the organization. Alternatively, a platform trust extension may submit the identifying information for an application and receive a result from a web or cloud service indicating whether the application should be semi-trusted.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system comprising:
   one or more processors; and
   a memory coupled to the processors comprising instructions executable by the processors, the processors being operable when executing the instructions to:
   present a list of one or more applications installed at the information handling system;
   present a list of one or more applications available to be installed at the information handling system;
   present an application source associated with each of the list of one or more applications installed and the list of one or more applications available to be installed;
   enumerate one or more semi-trusted keys used to sign each of the list of one or more applications installed and the list of one or more applications available to be installed;
   present a key source associated with each of the one or more semi-trusted keys; and
   by a platform trust extension:
   defining an additional trust level, wherein the additional trust level is granted a subset of permissions granted to the platform trust extension;
   maintaining the one or more semi-trusted keys;
   receiving a notification that at least one application from the list of one or more applications available to be installed or the list of one or more applications installed is selected for installation or execution on the information handling system;
   identifying the at least one application or the application source of the at least one application based, at least in part, on a signature of the at least one application;
   determining whether the at least one application or the application source of the at least one application is semi-trusted based at least in part upon the signature of the at least one application, wherein at least one of the one or more semi-trusted keys is used to sign the at least one application;
   setting the at least one application to run at the additional trust level if the at least one application or the application source of the at least one application and the at least one of the one or more semi-trusted keys are semi-trusted; and
   adding the one or more semi-trusted keys to a data store associated with the platform trust extension.

2. The information handling system of claim 1, wherein determining whether the at least one application or the application source is semi-trusted comprises comparing the identity of the at least one application or the application source against a list of semi-trusted applications or semi-trusted sources of applications, wherein finding a match indicates that the at least one application or the application source is semi-trusted.

3. The information handling system of claim 2, wherein the list of semi-trusted applications or semi-trusted sources of applications is received from a user of the information handling system.

4. The information handling system of claim 2, wherein the list of semi-trusted applications or semi-trusted sources of applications is received from an organization that owns or controls the information handling system.

5. The information handling system of claim 1, wherein determining whether the at least one application is semi-trusted comprises comparing the at least one of the one or more semi-trusted keys used to sign the at least one application to a key associated with a platform trust extension provider, wherein finding a match indicates that the at least one application is semi-trusted.

6. The information handling system of claim 1, wherein determining whether the at least one application is semi-trusted comprises comparing the at least one of the one or more semi-trusted keys used to sign the at least one application to a list of semi-trusted keys received from a provider of the platform trust extension, wherein finding a match indicates that the application is semi-trusted.

7. The information handling system of claim 6, wherein the list of semi-trusted keys is a file stored on the information handling system.

8. The information handling system of claim 6, wherein the list of semi-trusted keys is received from a cloud service.

9. One or more computer-readable non-transitory storage media embodying logic that is operable when executed to:
   present a list of one or more applications installed at the information handling system;
   present a list of one or more applications available to be installed at the information handling system;

present an application source associated with each of the list of one or more applications installed and the list of one or more applications available to be installed;

enumerate one or more semi-trusted keys used to sign each of the list of one or more applications installed and the list of one or more applications available to be installed;

present a key source associated with each of the one or more semi-trusted keys; and by a platform trust extension:

defining an additional trust level, wherein the additional trust level is granted a subset of permissions granted to the platform trust extension;

maintaining the one or more semi-trusted keys;

receiving a notification that at least one application from the list of one or more applications available to be installed or the list of one or more applications installed is selected for installation or execution on an information handling system;

identifying the at least one application or the application source of the at least one application based, at least in part, on a signature of the at least one application;

determining whether the at least one application or the application source of the at least one application is semi-trusted based at least in part upon the signature of the at least one application, wherein at least one of the one or more semi-trusted keys is used to sign the at least one application;

setting the at least one application to run at the additional trust level if the at least one application or the application source of the at least one application and the at least one of the one or more semi-trusted keys are semi-trusted; and adding the one or more semi-trusted keys to a data store associated with the platform trust extension.

10. The one or more computer-readable non-transitory storage media of claim 9, wherein determining whether the at least one application or the application source is semi-trusted comprises comparing the identity of the at least one application or the application source against a list of semi-trusted applications or semi-trusted sources of applications, wherein finding a match indicates that the at least one application or the application source is semi-trusted.

11. The one or more computer-readable non-transitory storage media of claim 10, wherein the list of semi-trusted applications or semi-trusted sources of applications is received from a user of the information handling system.

12. The one or more computer-readable non-transitory storage media of claim 10, wherein the list of semi-trusted applications or semi-trusted sources of applications is received from an organization that owns or controls the information handling system.

13. The one or more computer-readable non-transitory storage media of claim 9, wherein determining whether the at least one application is semi-trusted comprises comparing the at least one of the one or more semi-trusted keys used to sign the at least one application to a key associated with a platform trust extension provider, wherein finding a match indicates that the at least one application is semi-trusted.

14. The one or more computer-readable non-transitory storage media of claim 9, wherein determining whether the at least one application is semi-trusted comprises comparing the at least one of the one or more semi-trusted keys used to sign the at least one application to a list of semi-trusted keys received from a provider of the platform trust extension, wherein finding a match indicates that the application is semi-trusted.

15. The one or more computer-readable non-transitory storage media of claim 14, wherein the list of semi-trusted keys is a file stored on the information handling system.

16. The one or more computer-readable non-transitory storage media of claim 14, wherein the list of semi-trusted keys is received from a cloud service.

17. A method of providing platform trust extension comprising:

presenting a list of one or more applications installed at the information handling system;

presenting a list of one or more applications available to be installed at the information handling system;

presenting an application source associated with each of the list of one or more applications installed and the list of one or more applications available to be installed;

enumerating one or more semi-trusted keys used to sign each of the list of one or more applications installed and the list of one or more applications available to be installed;

presenting a key source associated with each of the one or more semi-trusted keys; and by a platform trust extension:

defining an additional trust level, wherein the additional trust level is granted a subset of permissions granted to the platform trust extension;

maintaining the one or more semi-trusted keys;

receiving a notification that at least one application from the list of one or more applications available to be installed or the list of one or more applications installed is selected for installation or execution on an information handling system;

identifying the at least one application or the application source of the at least one application based, at least in part, upon on a signature of the at least one application;

determining whether the at least one application or the application source of the at least one application is semi-trusted based at least in part upon the signature of the at least one application, wherein at least one of the one or more semi-trusted keys is used to sign the at least one application; and setting the at least one application to run at the additional trust level if the at least one application or the application source of the at least one application and the at least one of the one or more semi-trusted keys are semi-trusted; and adding the one or more semi-trusted keys to a data store associated with the platform trust extension.

18. The method of claim 17, wherein the step of determining whether the at least one application or the application source of the application is semi-trusted comprises:

comparing the identity of the at least one application or the application source against a list of semi-trusted applications or semi-trusted sources of applications, wherein finding a match indicates that the at least one application or the application source is semi-trusted.

19. The method of claim 17, wherein the step determining whether the application is semi-trusted comprises:

comparing the at least one of the one or more semi-trusted keys used to sign the at least one application to a key associated with a platform trust extension provider, wherein finding a match indicates that the at least one application is semi-trusted.

20. The method of claim 17, wherein the step of determining whether the at least one application is semi-trusted comprises:
  comparing the at least one of the one or more semi-trusted keys used to sign the at least one application to a list of semi-trusted keys received from a provider of the platform trust extension, wherein finding a match indicates that the application is semi-trusted.

* * * * *